(12) United States Patent
Aoki

(10) Patent No.: US 9,477,542 B2
(45) Date of Patent: Oct. 25, 2016

(54) ELECTRONIC CONTROL UNIT

(71) Applicant: DENSO CORPORATION, Kariya, Aichi-pref. (JP)

(72) Inventor: Mitsuru Aoki, Anjo (JP)

(73) Assignee: DENSO CORPORATION, Kariya (JP)

( * ) Notice: Subject to any disclaimer, the term of this patent is extended or adjusted under 35 U.S.C. 154(b) by 129 days.

(21) Appl. No.: 14/525,259

(22) Filed: Oct. 28, 2014

(65) Prior Publication Data
US 2015/0178144 A1 Jun. 25, 2015

(30) Foreign Application Priority Data

Dec. 24, 2013 (JP) .................................. 2013-265838

(51) Int. Cl.
*G06F 11/07* (2006.01)

(52) U.S. Cl.
CPC ......... *G06F 11/0757* (2013.01); *G06F 11/076* (2013.01); *G06F 11/0739* (2013.01)

(58) Field of Classification Search
CPC ............. G06F 11/0757; G06F 11/076; G06F 11/0739; G06F 11/0772; G06F 11/30; G06F 11/3024; G06F 11/0766; G06F 11/3466; G06F 11/1008; G06F 11/3055
See application file for complete search history.

(56) References Cited

U.S. PATENT DOCUMENTS

| | | | | |
|---|---|---|---|---|
| 5,530,946 A * | 6/1996 | Bouvier | ............... | G06F 11/0757 714/13 |
| 5,682,314 A * | 10/1997 | Nishino | ..................... | G06F 1/24 700/79 |
| 5,850,514 A | 12/1998 | Gonda et al. | | |
| 6,240,534 B1 * | 5/2001 | Nakane | ............... | G06F 11/0757 700/79 |
| 6,453,430 B1 * | 9/2002 | Singh | .................. | G06F 11/0715 712/227 |
| 2003/0060964 A1 * | 3/2003 | Ozeki | ..................... | F02D 41/22 701/114 |
| 2008/0126774 A1 * | 5/2008 | Kobayashi | ............... | G06F 1/22 713/1 |

FOREIGN PATENT DOCUMENTS

| | | |
|---|---|---|
| JP | 2003-155954 A | 5/2003 |
| JP | 2004-265322 A | 9/2004 |
| JP | 2007-065961 A | 3/2007 |
| JP | 2011-248396 A | 12/2011 |

OTHER PUBLICATIONS

Office Action issued Dec. 8, 2015 in the corresponding JP application No. 2013-265838 (with English translation).

* cited by examiner

*Primary Examiner* — Nadeem Iqbal
(74) *Attorney, Agent, or Firm* — Posz Law Group, PLC

(57) ABSTRACT

An ECU having a microcomputer for controlling a control object includes: a detection device that detects an anomalous operation of the microcomputer; a first reset device that outputs a reset signal for the microcomputer when the detection device detects the anomalous operation; a failsafe control device that executes a failsafe control operation for controlling the control object to be safer than the control object before resetting the microcomputer when the microcomputer is reset to a normal state; a counting device that counts a number of times of occurrence of the anomalous operation when the detection device detects the anomalous operation again after the failsafe control device starts to execute the failsafe control operation; and a second reset device that outputs the reset signal and holds an output of the reset signal when the number of times of occurrence reaches a predetermined number of times.

4 Claims, 3 Drawing Sheets

ELECTRONIC CONTROL UNIT

CROSS REFERENCE TO RELATED APPLICATION

This application is based on Japanese Patent Application No. 2013-265838 filed on Dec. 24, 2013, the disclosure of which is incorporated herein by reference.

TECHNICAL FIELD

The present disclosure relates to an electronic control unit equipped with a microcomputer for electronically controlling a predetermined controlled object.

BACKGROUND

For example, Patent Literature 1 discloses an anomaly monitoring apparatus for microcomputers that is capable of monitoring the repetitive anomalous operation as well as the sporadic anomalous operation of a microcomputer. This anomaly monitoring apparatus monitors any anomaly in a microcomputer by a watchdog (WD) signal from the microcomputer and further counts the number of times of occurrence of anomalous operation of the microcomputer. As long as the number of times of occurrence of anomalous operation is smaller than a reference number of times, the anomaly monitoring apparatus generates a pulsed reset signal and tries to restore the microcomputer to normal state. Meanwhile, when the number of times of occurrence of anomalous operation exceeds the reference number of times, the anomaly monitoring apparatus generates a reset hold signal and stops the control by the microcomputer.

However, for example, when the controlled object of a microcomputer is a vehicle engine, a problem arises. If the control by the microcomputer is stopped immediately when anomalous operation occurs in the microcomputer more frequently than a reference number of times, the engine is stopped and the vehicle is rendered inoperable. When the operation of the microcomputer becomes anomalous and a reset signal is outputted to the microcomputer but the operation of the microcomputer is not restored to normal state by outputting the reset signal once, the following takes place: the anomaly monitoring apparatus continuously detects the anomalous operation of the microcomputer. For this reason, the microcomputer is not restored to normal state and moreover, there is the possibility that the control of the microcomputer will be stopped. As a result, there is the possibility that an undesirable situation will be contrarily incurred depending on the circumstances in which the vehicle is placed. As mentioned above, holding a reset signal in conventional anomaly monitoring apparatuses is not always sufficient to cope with the anomalous operation of the microcomputer depending on the type of the controlled object.

[Patent Literature 1] JP-A-2004-265322

SUMMARY

It is an object of the present disclosure to provide an electronic control unit in which the following is possible when an anomaly occurs in the operation of a microcomputer: continuing electronic control by the microcomputer as much as possible with safety taken into account.

According to an aspect of the present disclosure, an electronic control unit having a microcomputer for electronically controlling a predetermined control object, includes: a detection device that detects an anomalous operation of the microcomputer; a first reset device that outputs a reset signal for resetting the microcomputer for a predetermined time interval when the detection device detects the anomalous operation of the microcomputer; a failsafe control device that executes a failsafe control operation for controlling the control object to be safer than a control operation of the control object before resetting the microcomputer when the microcomputer is reset to a normal state by the reset signal output from the first reset device; a counting device that counts a number of times of occurrence of the anomalous operation of the microcomputer based on a detection result of the anomalous operation when the detection device detects the anomalous operation of the microcomputer again after the failsafe control device starts to execute the failsafe control operation; and a second reset device that outputs the reset signal for resetting the microcomputer and holds an output of the reset signal when the number of times of occurrence counted by the counting device reaches a predetermined number of times.

According to the electronic control unit of the present disclosure, as mentioned above, the following takes place when anomalous operation occurs in the microcomputer: when the operation of the microcomputer is restored to normal state by a reset signal, failsafe control is carried out as control by the microcomputer. In the failsafe control, the controlled object is controlled to the safety side more than before the occurrence of the anomalous operation. For example, when a vehicle engine is the controlled object, the following control is carried out as failsafe control: control to produce driving force in the engine to the extent that the vehicle can make so-called retreat running. This failsafe control is simpler than normal control. Therefore, even when an anomaly occurs in normal control, any anomaly may not occur in failsafe control. Therefore, it is possible to enhance the possibility that control by the microcomputer will be continued as much as possible with safety taken into account.

In the electronic control unit of the present disclosure, the following takes place when the operation of the microcomputer still becomes anomalous even after failsafe control is started instead of normal control: the counting device counts the number of times by which the operation of the microcomputer became anomalous. When the number of times counted by the counting device reaches a predetermined number of times, the output of a reset signal is held to stop control by the microcomputer. In other words, even if anomalous operation occurs while the microcomputer is carrying out normal control, the following measure is taken when it is determined whether or not the output of the reset signal should be held: the number of times of occurrence of that anomalous operation is not taken into account. For this reason, for example, even when the operation of a microcomputer is not restored to normal state by outputting a reset signal once and anomalous operation is repetitively detected, the following does not take place: the output of the reset signal is thereby held and the control of the microcomputer is not stopped. Therefore, also from this point of view, according to the present disclosure, it is possible to enhance the possibility that control by the microcomputer will be continued with safety taken into account.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereafter, a description will be given to an electronic control unit in an embodiment of the present disclosure with reference to the drawings. In the following description of the embodiment, the following case will be taken as an example: a case where the microcomputer of the electronic control unit controls a vehicle engine as controlled object. However, the controlled object of the microcomputer need not be a vehicle engine and any other device may be the controlled object.

Figure 1:
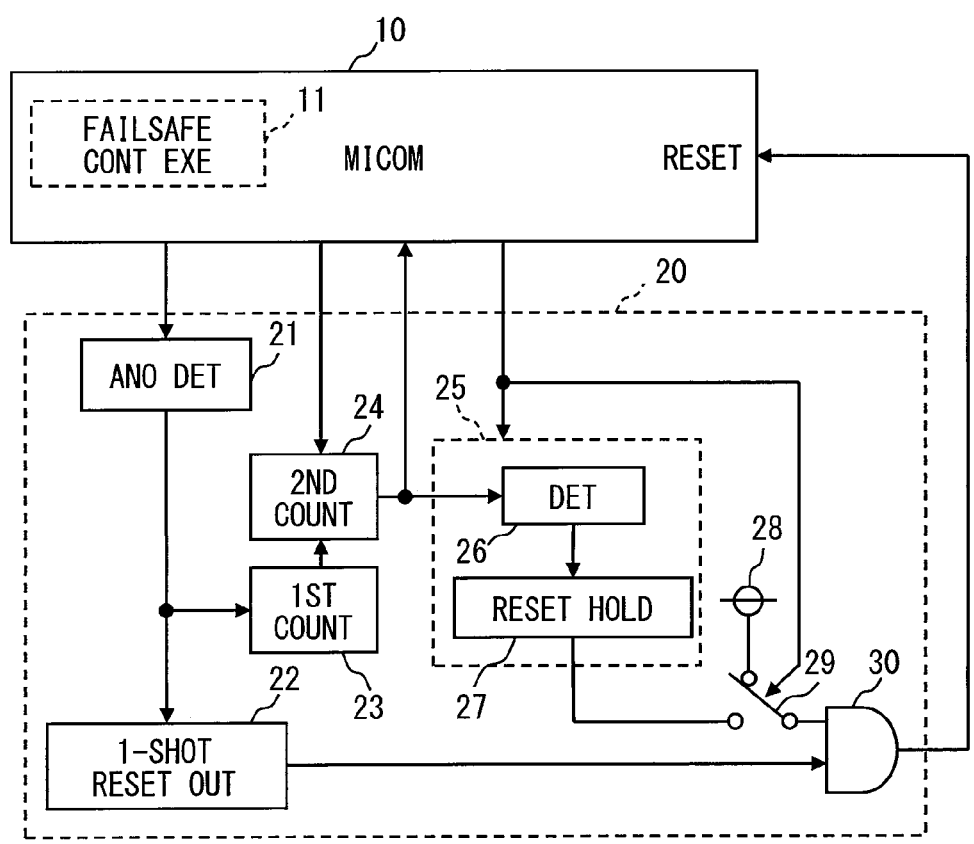
FIG. 1 is a block diagram schematically illustrating the overall configuration of an electronic control unit in an embodiment.

The electronic control unit illustrated in FIG. 1 includes a microcomputer 10 and the microcomputer 10 controls an engine (not shown) mounted in a vehicle. For example, the microcomputer 10 controls actuators such as the fuel injection valves equipped in an internal combustion engine, an ignition device, a throttle value, and the like based on detection values on various sensors. As is well known, the microcomputer 10 is comprised of CPU, ROM, RAM, and the like. In ROM, engine control programs are stored and CPU performs computation according to the engine control programs to calculate control command values for the above-mentioned various actuators. The actuators are operated according to the calculated control command values and the operating state of the engine is thereby controlled so that engine output and exhaust emission will be brought into desired states. The CPU repetitively executes the above-mentioned engine control programs at predetermined time intervals.

The engine control programs stored in ROM include a control program for normal control and a control program for failsafe control as a rule. The control program for normal control carries out control so as to produce engine output corresponding to the amount of depression of the accelerator pedal by the driver. The control program for failsafe control carries out control so as to produce engine output to the extent that the vehicle can make so-called retreat running in an emergency. As mentioned above, the control program for failsafe control reduces engine output and thereby controls the engine to the safety side more than in normal control. Also as for the details of the control, the control program for failsafe control is simpler than the control program for normal control. In FIG. 1, the functions carried out by the microcomputer 10 when the microcomputer 10 executes the control program for failsafe control are depicted as failsafe control execution part 11. This failsafe control execution part 11 is equivalent to failsafe control device.

As long as the microcomputer 10 is normally executing an engine control program, it outputs a watchdog pulse signal at predetermined time intervals. This watchdog pulse signal is supplied to a monitoring circuit 20.

The monitoring circuit 20 has an anomaly detection part 21 as a detection device. This anomaly detection part 21 is equipped with a timer for counting the time that has lapsed after the input of a watchdog pulse signal from the microcomputer 10. This timer has its time count reset each time a watchdog pulse signal is inputted. For this reason, when the time count on the timer gets beyond a monitoring time when the next watchdog pulse signal should be inputted, the following takes place: the anomaly detection part 21 considers that some anomaly has occurred in the microcomputer 10 and outputs an anomaly detection signal.

In conjunction with the output of the anomaly detection signal, the anomaly detection part 21 resets the time count on the timer and causes it to newly count time. When the time count on the timer gets beyond the monitoring time, it considers that the microcomputer 10 has not been restored to normal state and outputs an anomaly detection signal again.

The anomaly detection signal from the anomaly detection part 21 is supplied to a one-shot reset output part 22 and a first counter 23 as a first reset device. The one-shot reset output part 22 outputs a reset signal of Low level only for a predetermined time in response to the anomaly detection signal. This reset signal is inputted to the reset terminal of the microcomputer 10 through an AND gate 30. As a result, the anomalous microcomputer 10 is reset and an attempt is made to restore the microcomputer 10 to normal state. However, when the microcomputer 10 is not restored to normal state by outputting the reset signal once, as mentioned above, an anomaly detection signal is outputted from the anomaly detection part 21 each time the monitoring time has passed. For this reason, the microcomputer 10 has a reset signal repetitively inputted from the one-shot reset output part 22 until it is restored to normal state.

The first counter 23 counts the number of anomaly detection signals outputted from the anomaly detection part 21. However, the first counter 23 may count the number of reset signals outputted by the one-shot reset output part 22, not the number of anomaly detection signals outputted by the anomaly detection part 21. The number of anomaly detection signals counted by the first counter 23 is outputted to a second counter 24 as a counting device.

The microcomputer 10 instructs the second counter 24 to perform count processing in initialization processing performed at the time of start after the restoration from anomalous operation. The second counter 24 includes: a storage part for storing the count value on the first counter 23 obtained when an instruction to perform count processing was given from the microcomputer 10 last time; and a comparison part that compares the count value stored in the storage part with the count value on the first counter 23 this time. When it is determined at the comparison part that the count value this time is larger than the stored count value, the count value on the second counter 24 is incremented by one. As a result, the following can be implemented regardless of how many reset signals were outputted to restore the microcomputer 10 from anomalous operation to normal state after the anomalous operation occurred in the microcomputer 10: when the microcomputer 10 is restored from anomalous operation to normal state, the second counter 24 can count the number of times of occurrence of that anomalous operation. The number of times of occurrence of anomalous operation of the microcomputer 10 counted by the second counter 24 is outputted to the microcomputer 10 and a determination part 26 of a reset signal hold circuit 25 as a second reset device.

The microcomputer 10 determines whether or not it is required to start failsafe control based on the number of times of occurrence of anomalous operation counted by the second counter 24. When it is determined that failsafe control is required, it carries out failsafe control. When it carries out failsafe control for the first time, it outputs an enabling signal to the reset signal hold circuit 25 and switch circuit 29 described later. That is, before anomalous operation of the microcomputer 10 occurs, the microcomputer 10 carries out normal control; and after anomalous operation occurs, the microcomputer 10 carries out failsafe control. The microcomputer 10 may carries out failsafe control when anomalous operation once occurs or may start the execution of failsafe control on the following occasion: when anomalous operation occurs a predetermined number of a plurality of times (twice or more), that is, when anomalous operation and restoration to normal state are repeated a predetermined number of times. In the description of this embodiment, a case where failsafe control is carried out when anomalous operation once occurs will be taken as an example.

Before failsafe control is carried out (that is, during the execution of normal control), the microcomputer 10 outputs a disabling signal to the reset signal hold circuit 25 and the switch circuit 29. By this disabling signal, the reset signal hold circuit 25 remains out of operation and the switch circuit 29 outputs a non-reset signal of High level from a power source 28 to the AND gate 30. This makes it possible to reliably prevent a reset signal from being erroneously outputted from the reset signal hold circuit 25 and the reset signal from being held. The microcomputer 10 may output a disabling signal and an enabling signal to only either of them. When the microcomputer 10 outputs a disabling signal to the reset signal hold circuit 25, the switch circuit 29 may be omitted. Conversely, when the switch circuit 29 is provided and a disabling signal is supplied from the microcomputer 10 to the switch circuit 29, the microcomputer 10 need not output a disabling signal to the reset signal hold circuit 25.

In conjunction with start of the execution of failsafe control, the microcomputer 10 outputs an enabling signal to the reset signal hold circuit 25 and the switch circuit 29. By this enabling signal, the reset signal hold circuit 25 starts operation and the switch circuit 29 changes its switch position so that the output of the reset holding part 27 described later is inputted to the AND gate 30.

The determination part 26 of the reset signal hold circuit 25 determines whether or not the number of times of occurrence of anomalous operation counted by the second counter 24 has reached a predetermined number of times as a threshold value. When the determination part 26 determines that the predetermined number of times has been reached, it instructs the reset holding part 27 to output a reset signal. In response to this output instruction, the reset holding part 27 outputs a reset signal and holds the output. This stops the operation of the microcomputer 10 and as a result, failsafe control on the engine is also terminated.

Figure 2:
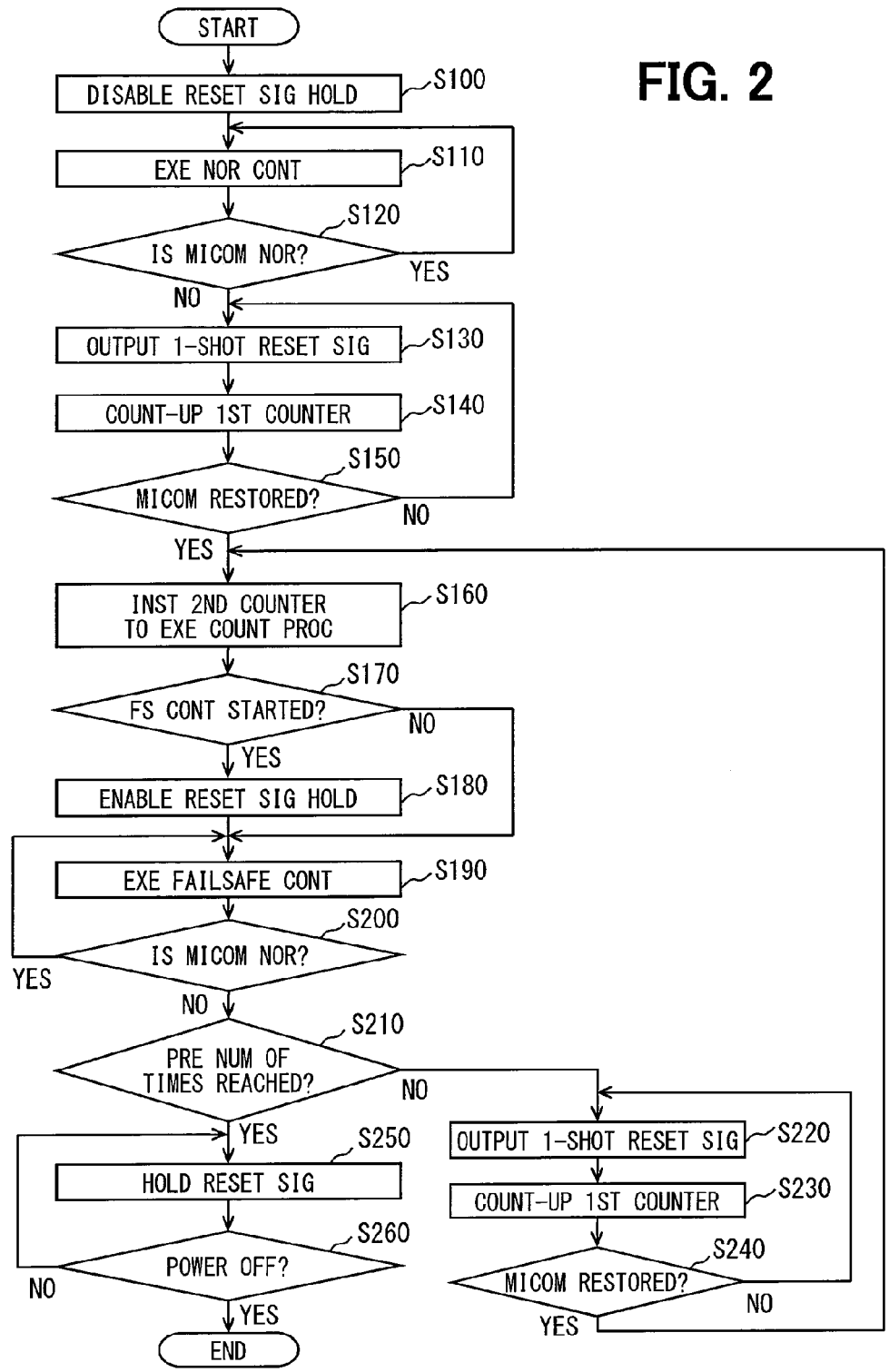
FIG. 2 is a flowchart showing processing carried out in an electronic control unit.

A description will be given to the flow of processing at the electronic control unit configured as mentioned above with reference to the flowchart in FIG. 2 and the timing chart in FIG. 3. The processing shown by the flowchart in FIG. 2 is started when power supply to the electronic control unit is started (power on).

At Step S100, first, reset signal hold disabling setting is made. Specifically, a disabling signal is outputted to the reset signal hold circuit 25 and the switch circuit 29. As a result, as shown in FIG. 3, the reset signal hold circuit 25 is disabled and the operation thereof is kept stopped. The switch circuit 29 outputs a non-reset signal of High level to the AND gate 30.

At Step S110, subsequently, the microcomputer 10 carries out normal control on the engine as controlled object. This embodiment is so configured that when the microcomputer 10 is started by power on, it carries out normal control. However, the disclosure may be configured so that even when the microcomputer 10 is started by power on, the following processing is carried out: the microcomputer 10 checks the number of times of occurrence of anomalous operation on the second counter 24; when anomalous operation has not occurred, it starts normal control and when anomalous operation has occurred, it starts failsafe control.

When the microcomputer 10 is normal during the execution of normal control, a watchdog pulse signal is outputted at predetermined time intervals. At Step S120, it is determined at the anomaly detection part 21 whether or not the microcomputer 10 is normally operating based on the watchdog pulse signal outputted from the microcomputer 10.

When the watchdog pulse signal is inputted within the monitoring time and it is determined by the anomaly detection part 21 at Step S120 that the microcomputer 10 is normally operating, a reset signal is not outputted from the monitoring circuit 20. Therefore, the normal control of Step S110 is continuously carried out. Meanwhile, when a watchdog pulse signal is not inputted even after the monitoring time has passed and it is determined that the microcomputer 10 is not normally operating (confirmation of occurrence of anomalous operation), the processing proceeds to Step S130. At Step S130, the one-shot reset output part 22 of the monitoring circuit 20 outputs a one-shot reset signal to reset the microcomputer 10 in anomalous operation. At Step S140, the first counter 23 is caused to count up.

At Step S150, the anomaly detection part 21 determines whether or not the microcomputer 10 has been restored to normal state according to the reset signal outputted at Step S130. Specifically, when a watchdog pulse signal is outputted from the microcomputer 10, it is determined that the microcomputer 10 has been restored to normal state. When the microcomputer 10 has not been restored to normal state, the processing of Step S130, that is, the output of a one-shot reset signal is repeated until it is restored to normal state. Meanwhile, when it has been restored to normal state, the processing proceeds to Step S160.

At Step S160, the microcomputer 10 instructs the second counter 24 to perform count processing as part of initialization processing. As a result, the number of times of occurrence of anomalous operation of the microcomputer 10 is counted at the second counter 24. At Step S170, it is determined whether or not a condition for starting failsafe control has held based on the number of times of occurrence of anomalous operation counted by the second counter 24. That is, it is determined whether or not the number of times of occurrence of anomalous operation has agreed with a number of times at which failsafe control should be started. When it is determined in this determination processing that a condition for starting failsafe control has held, the processing proceeds to Step S180 and reset signal hold enabling setting is made. Specifically, an enabling signal is outputted to the reset signal hold circuit 25 and the switch circuit 29. As a result, as shown in FIG. 3, the reset signal hold circuit 25 is enabled and starts operation. The switch circuit 29 changes the switch position thereof so that the output of the reset holding part 27 is inputted to the AND gate 30. Meanwhile, when the number of times of occurrence of anomalous operation is larger than the number of times at which failsafe control should be started, Step S180 is skipped and the processing proceeds to Step S190.

At Step S190, the microcomputer 10 carries out failsafe control after initialization processing. Specifically, when a vehicle engine is controlled object, the following control is carried out as failsafe control: control to produce driving force in the engine to the extent that the vehicle can make so-called retreat running. The failsafe control is simpler than the normal control. Therefore, even in case where an anomaly occurs in the microcomputer 10 in normal control, any anomaly may not take place in failsafe control. Consequently, it is possible to enhance the possibility that control by the microcomputer 10 will be continued as much as possible with safety taken into account.

At Step S200, subsequently, it is determined at the anomaly detection part 21 whether or not the microcomputer 10 is normally operating based on a watchdog pulse signal outputted from the microcomputer 10. When it is determined at Step S200 that the microcomputer 10 is normally operating, the failsafe control of Step S180 is continuously carried out. Step S180 corresponds to an enabling device. Meanwhile, when it is determined that the microcomputer 10 is not normally operating, the processing proceeds to Step S210.

At Step S210, it is determined whether or not the number of times of occurrence of anomalous operation counted by the second counter 24 is equal to or larger than a predetermined number of times. When it is determined in this determination processing that the predetermined number of times is not reached, the processing proceeds to Step S220; and when it is determined that the predetermined number of times has been reached or exceeded, the processing proceeds to Step S250.

At Step S220, the one-shot reset output part 22 outputs a one-shot reset signal to reset the microcomputer 10 in anomalous operation. At Step S230, subsequently, the first counter 23 is caused to count up. At Step S240, the anomaly detection part 21 determines whether or not the microcomputer 10 has been restored to normal state according to the reset signal outputted at Step S210. When it is determined at Step S230 that the microcomputer 10 has been restored to normal state, the processing returns to Step S160. As mentioned above, even when anomalous operation occurs in the microcomputer 10 after failsafe control is started, the following takes place as long as the number of times of anomalous operation is smaller than the predetermined number of times: the microcomputer 10 is reset and an attempt is made to continue failsafe control.

However, when anomalous operation repetitively occurs in the microcomputer 10 and the number of times of occurrence of anomalous operation reaches a predetermined number of times (for example, three times), the following is suspected: the microcomputer 10 is in anomalous state and cannot normally carry out even failsafe control. At Step S250, therefore, the determination part 26 of the monitoring circuit 20 outputs a reset signal to the reset holding part 27. As a result, the reset holding part 27 outputs a reset signal and holds the output. This hold of the reset signal is continued until power supply is turned off.

Figure 3:
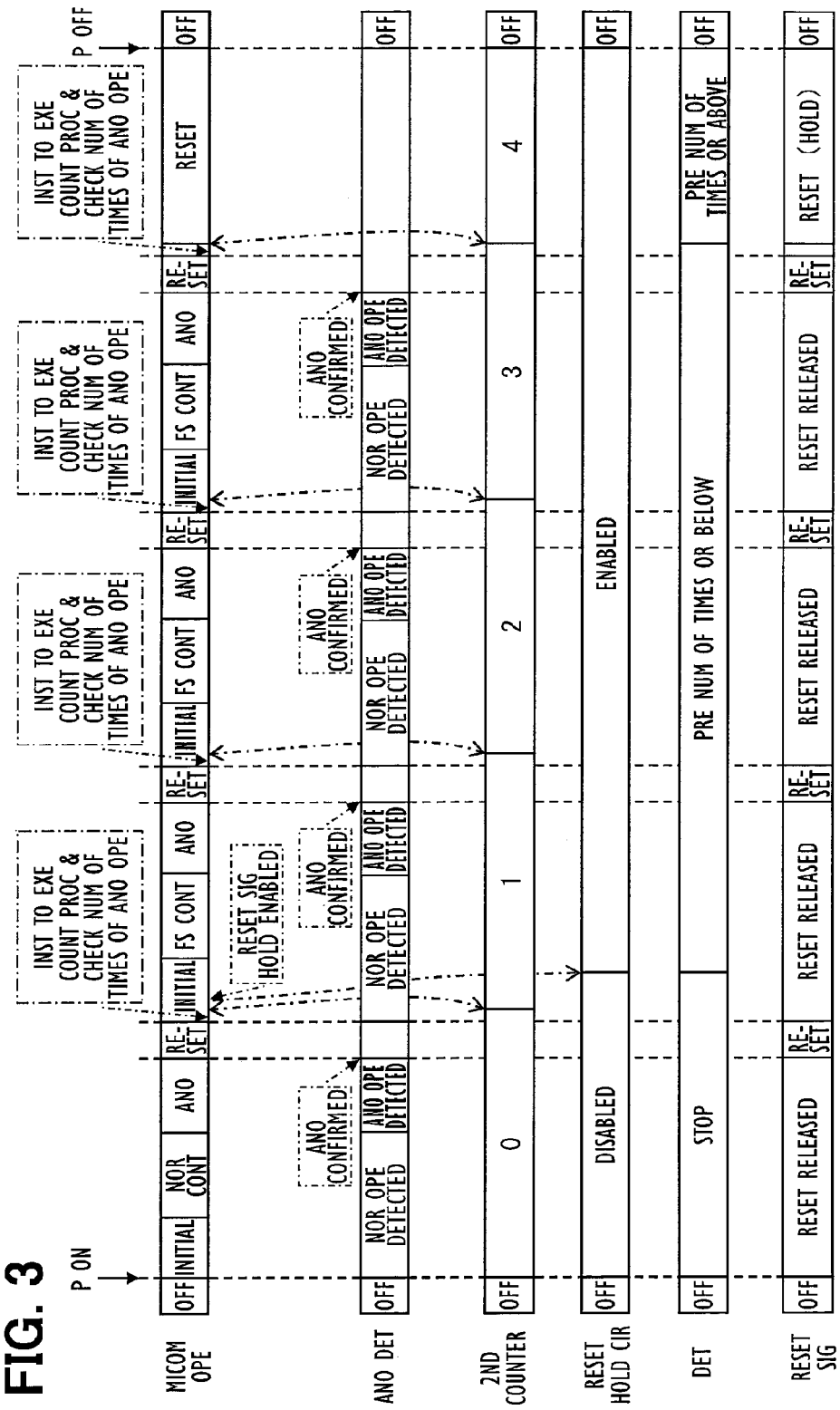
FIG. 3 is a timing chart showing the operation carried out at each part of an electronic control unit when anomalous operation occurs in a microcomputer.

FIG. 3 shows the following case as an example: a case where when failsafe control is carried out but anomalous operation occurs in the microcomputer 10 three times. In this case, the determination part 26 determines that the predetermined number of times has been reached and a reset signal is held. The number of times of occurrence of anomalous operation counted by the second counter 24 includes the number of times of occurrence of anomalous operation during the execution of normal control. Whether or not the output of a reset signal should be held can be determined based on the following by adding it to determine a threshold value: the number of times of occurrence of anomalous operation during the execution of failsafe control.

Up to this point, a description has been given to a preferred embodiment of the present disclosure. However, the present disclosure is not limited to the above embodiment at all and can be variously modified and embodied without departing from the subject matter of the present disclosure.

An example will be taken. In the above-mentioned embodiment, the second counter 24 counts the number of times of occurrence of anomalous operation of the microcomputer 10 with the number of times of occurrence of anomalous operation during the execution of normal control included. Instead, only the number of times of occurrence of anomalous operation during failsafe control may be counted by taking the following measure: when a condition for starting failsafe control holds, an enabling signal is outputted to the second counter 24 to cause it to start counting operation. In this case, whether or not a condition for starting failsafe control can be determined based on the count value on the first counter 23.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An electronic control unit having a microcomputer for electronically controlling a predetermined control object, the electronic control unit comprising:
   a detection device that detects an anomalous operation of the microcomputer;
   a first reset device that outputs a reset signal for resetting the microcomputer for a predetermined time interval when the detection device detects the anomalous operation of the microcomputer;
   a failsafe control device that executes a failsafe control operation for controlling the control object to be safer than a control operation of the control object before resetting the microcomputer when the microcomputer is reset to a normal state by the reset signal output from the first reset device;
   a counting device that counts a number of times of occurrence of the anomalous operation of the microcomputer based on a detection result of the anomalous operation when the detection device detects the anomalous operation of the microcomputer again after the failsafe control device starts to execute the failsafe control operation;
   a second reset device that outputs the reset signal for resetting the microcomputer and holds an output of the reset signal when the number of times of occurrence counted by the counting device reaches a predetermined number of times; and
   an enabling device,
   wherein the second reset device is disabled before the failsafe control device starts to execute the failsafe control operation, and wherein the enabling device enables the second reset device to output the reset signal to the microcomputer when the failsafe control device starts to execute the failsafe control operation.

2. The electronic control unit according to claim 1, wherein, when the first reset device outputs the reset signal but the microcomputer is not reset to the normal state, the detection device continuously detects the anomalous operation of the microcomputer, and the first reset device repeats to output the reset signal for the predetermined time interval until the microcomputer is reset to the normal state.

3. The electronic control unit according to claim 1, wherein the failsafe control device executes the failsafe control operation when the occurrence of the anomalous operation of the microcomputer and a reset to the normal operation are repeated a predetermined number of times.

4. The electronic control unit according to claim 1, wherein:
the enabling device outputs an enabling signal to the second reset device to output the reset signal when the failsafe control device starts to execute the failsafe control operation.

* * * * *